US012773067B2

(12) United States Patent
Fuqua, III et al.

(10) Patent No.: US 12,773,067 B2
(45) Date of Patent: Oct. 27, 2026

(54) COOKING GRILLS AND RELATED METHODS

(71) Applicant: WTX Grill Partners, LLC, Midland, TX (US)

(72) Inventors: Richard Lee Fuqua, III, Midland, TX (US); William Duke Edwards, III, Midland, TX (US); Edward Kyle Milling, Jr., Birmingham, AL (US); William Rogan Tindol, Fort Worth, TX (US); Grant Michael Sirgo, Midland, TX (US)

(73) Assignee: WTX Grill Partners, LLC, Midland, TX (US)

( * ) Notice: Subject to any disclaimer, the term of this patent is extended or adjusted under 35 U.S.C. 154(b) by 855 days.

(21) Appl. No.: 17/880,102

(22) Filed: Aug. 3, 2022

(65) Prior Publication Data

US 2024/0041255 A1 Feb. 8, 2024

Related U.S. Application Data

(60) Provisional application No. 63/228,843, filed on Aug. 3, 2021.

(51) Int. Cl.
*A47J 37/07* (2006.01)
*A01D 90/02* (2006.01)

(52) U.S. Cl.
CPC .......... *A47J 37/0763* (2013.01); *A01D 90/02* (2013.01); *A47J 37/0704* (2013.01)

(58) Field of Classification Search
CPC ...... B62D 33/03; A01D 90/02; A47J 37/0704; A47J 37/0763; F24B 1/202; F24B 1/205; F24B 1/207
See application file for complete search history.

(56) References Cited

U.S. PATENT DOCUMENTS

| | | | | |
|---|---|---|---|---|
| 3,769,920 | A * | 11/1973 | Weiss .................. | A47B 3/0918 108/133 |
| 6,863,063 | B2 | 3/2005 | Yeh | |
| 7,958,882 | B1 | 6/2011 | Sgourides | |
| 8,201,550 | B2 | 6/2012 | Malumyan | |
| 9,402,508 | B2 | 8/2016 | Cothern | |
| 9,849,582 | B2 * | 12/2017 | Cheff ........................ | B62B 3/02 |
| 2005/0252504 | A1 | 11/2005 | Cabrera et al. | |
| 2014/0265186 | A1 * | 9/2014 | Witzel .................. | A47J 37/049 280/35 |
| 2017/0095114 | A1 | 4/2017 | O'Shaughnessy et al. | |

* cited by examiner

*Primary Examiner* — Jorge A Pereiro
(74) *Attorney, Agent, or Firm* — Conley Rose, P.C.; Charles J. Rogers

(57) ABSTRACT

An example cooking grill comprises a cooking chamber, and a leg coupled to the cooking chamber. The leg is to transition between: a deployed position in which the leg extends outward from the cooking chamber; and a collapsed position in which the leg is received within a channel on a bottom side of the cooking chamber.

15 Claims, 18 Drawing Sheets

COOKING GRILLS AND RELATED METHODS

CROSS-REFERENCE TO RELATED APPLICATIONS

This application claims benefit of U.S. provisional patent application Ser. No. 63/228,843 filed Aug. 3, 2021, and entitled "Cooking Grills and Related Methods," which is hereby incorporated herein by reference in its entirety.

STATEMENT REGARDING FEDERALLY SPONSORED RESEARCH OR DEVELOPMENT

Not applicable.

BACKGROUND

Cooking grills are used for cooking food items (e.g., meat, vegetables, etc.) via a direct or indirect heat source, which may comprise combusted fuel (e.g., charcoal, natural gas, propane, etc.). In some instances, a cooking grill may be mobile in that it may be transported from place to place.

BRIEF SUMMARY

Some embodiments disclosed herein are directed to a cooking grill. In some embodiments, the cooking grill includes a cooking chamber and a leg coupled to the cooking chamber. The leg is to transition between: a deployed position in which the leg extends outward from the cooking chamber; and a collapsed position in which the leg is received within a channel on a bottom side of the cooking chamber.

In some embodiments, the cooking grill includes a cooking chamber including a longitudinal axis, a first end, and a second end opposite the first end. In addition, the cooking grill includes a plurality of legs pivotably coupled to the cooking chamber. Further, the cooking grill includes a lift bar coupled to the cooking chamber at a first connection and a second connection. The first connection is more proximate the first end then the second end and the second connection is more proximate the second end than the first end, and the lift bar is configured to pivot relative to the cooking chamber about the first connection. Still further, the cooking grill includes a release mechanism coupled to the second connection that is configured to disconnect the second connection.

Other embodiments disclosed herein are directed to a method of loading a cooking grill onto a storage surface. In some embodiments, the method includes (a) positioning the cooking grill proximate the storage surface. The cooking grill includes a cooking chamber having a first end and a second end opposite the first end, one or more legs coupled to the cooking chamber, and a lift bar coupled to the cooking chamber at a first connection and a second connection. The first connection is more proximate the first end and the second end and the second connection is more proximate the second end than the first end. In addition, the method includes (b) disconnecting the lift bar from the cooking chamber at the second connection; and (c) engaging the lift bar with the storage surface. Further, the method includes (d) pivoting the lift bar about the first connection after (c); (e) lifting the cooking chamber upward during (d); and (f) moving the cooking grill onto the storage surface after (e).

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

A cooking grill may be a mobile cooking grill that is transported from place to place. In some instances, a cooking grill may be transported in a vehicle. The storage areas within most vehicles, such as, for instance, a pickup truck bed, a sedan trunk, a rear storage compartment of a sport utility vehicle (SUV), are raised above the ground. Similarly, a user may wish to store a cooking grill on an elevated platform, such as a shelf or table. As a result, loading and unloading of a cooking grill into or from, respectively, a raised platform (e.g., a vehicle storage area) involves lifting or lowering the cooking grill therefrom. Thus, the size and weight of a cooking grill may be limited to allow a user to safely load and unload the cooking grill from such raised platforms during operations.

Accordingly, the embodiments disclosed herein include cooking grills that may be more easily loaded and unloaded from a raised platform, such as, for instance from a vehicle storage compartment (e.g., a bed of a pickup truck). In some examples, the embodiments of the cooking grills may allow a user to efficiently load and unload the cooking grill onto and from, respectively, a raised platform while still allowing the overall size and/or cooking capacity of the cooking grill to be maximized. Thus, through use of the embodiments disclosed herein, a user may more easily and safely transport and maneuver a relatively large cooking grill.

Figure 1:
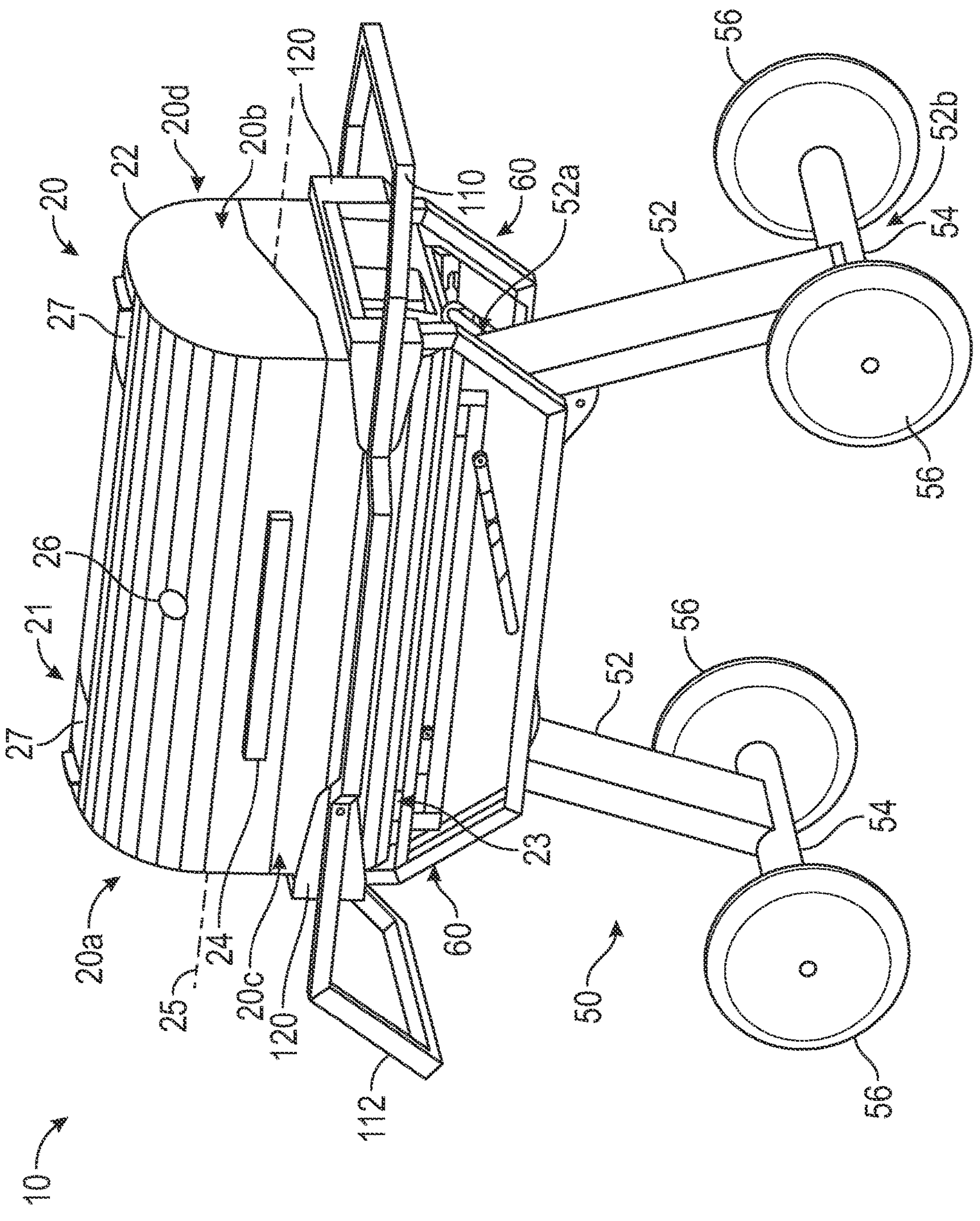
FIG. 1 is a perspective view of a cooking grill according to some embodiments.
Figure 2:
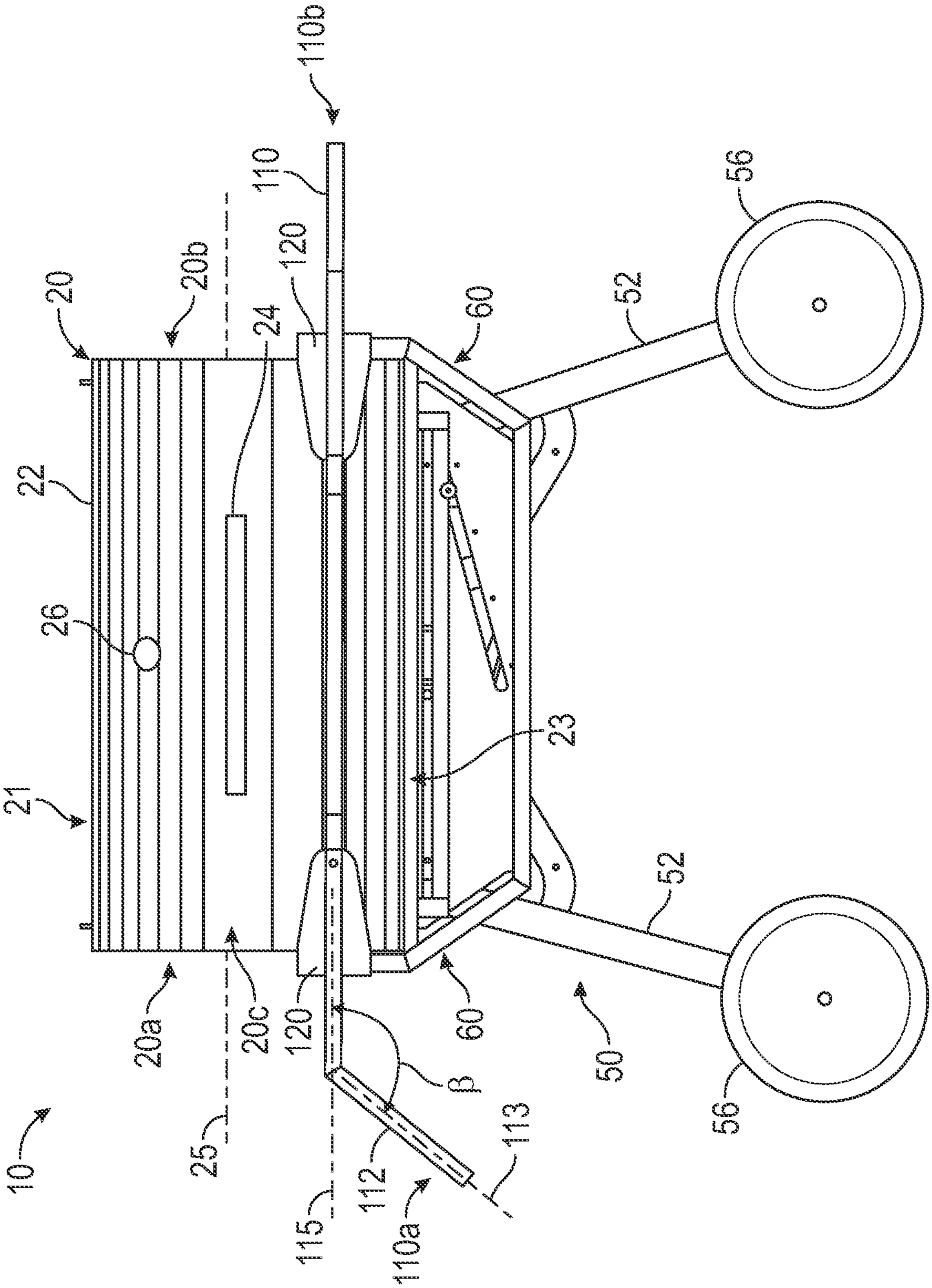
FIG. 2 is a front view of the cooking grill of FIG. 1 according to some embodiments.
Figure 3:
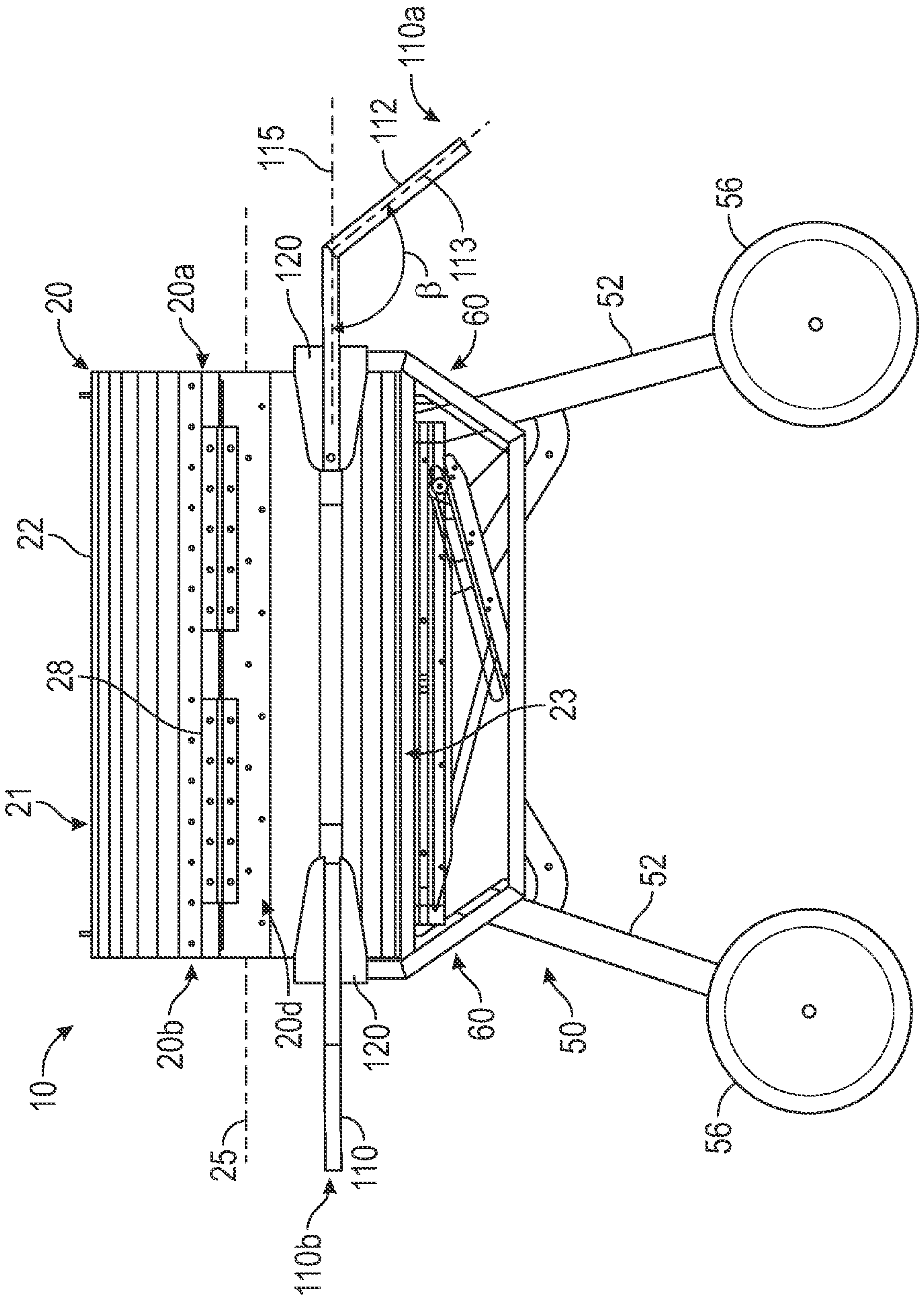
FIG. 3 is a back view of the cooking grill of FIG. 1 according to some embodiments.

Referring now to FIGS. 1-3, a cooking grill 10 according to some embodiments is shown. Generally speaking, cooking grill 10 comprises a cooking chamber 20 and a collapsible leg assembly 50 coupled to the cooking chamber 20 (note: collapsible leg assembly 50 may be more simply referred to herein as "leg assembly 50"). In some embodiments cooking grill 10 may be configured to smoke (e.g., in addition or to in lieu of grilling) food items during use.

The cooking chamber 20 includes a lid 22 that is rotatable about a hinge assembly 28 (FIG. 3) to provide access thereto. During operations, the cooking chamber 20 may contain a heat source and a grill (not shown) that is to suspend food item(s) over (e.g., directly over, indirectly over) the heat source. In some embodiments, the heat source may comprise combusting fuel (e.g., burning wood, charcoal). In some embodiments, the heat source may comprise burner for burning a fluid fuel, such as, for instance, propane, natural gas (e.g., methane, ethane). In some embodiments, the heat source may comprise electric coil(s) that emit heat when energized with electric current.

Cooking chamber 20 includes a longitudinal axis 25, a first end 20*a*, and a second end 20*b* spaced from first end 20*a* along longitudinal axis 25. In addition, cooking chamber 20 includes a first or front side 20*c*, and a second or back side radially opposite the front side 20*c* across axis 25. The front side 20*c* and rear side 20*d* both extend axially between the ends 20*a*, 20*b*. Further, cooking chamber 20 includes a top side 21 and a bottom side 23 radially opposite top side 21 across axis 25.

The lid 22 may comprise a handle 24 on front side 20*c* that may be grasped by a user to open or close the lid 22 during operations. The hinge assembly 28 may be positioned along the back side 20*d*. In addition, the lid 22 may comprise a temperature probe 26 positioned along front side 20*c* that is configured to measure or detect the temperature within the cooking chamber 20 during operations. Further, top side 21 may include one or more (e.g., two in some embodiments) adjustable vents 27 for venting smoke, steam, and/or other fluids during operations.

Referring still to FIGS. 1-3, leg assembly 50 (or more simply "leg assembly 50") comprises a plurality of legs 52 that are coupled to cooking chamber 20. Each leg comprises a first or inner end 52*a* and a second or outer end 52*b* opposite inner end 52*a*. Outer end 52*b* includes an axle 54 that is coupled to a pair of wheels 56.

Figure 4:
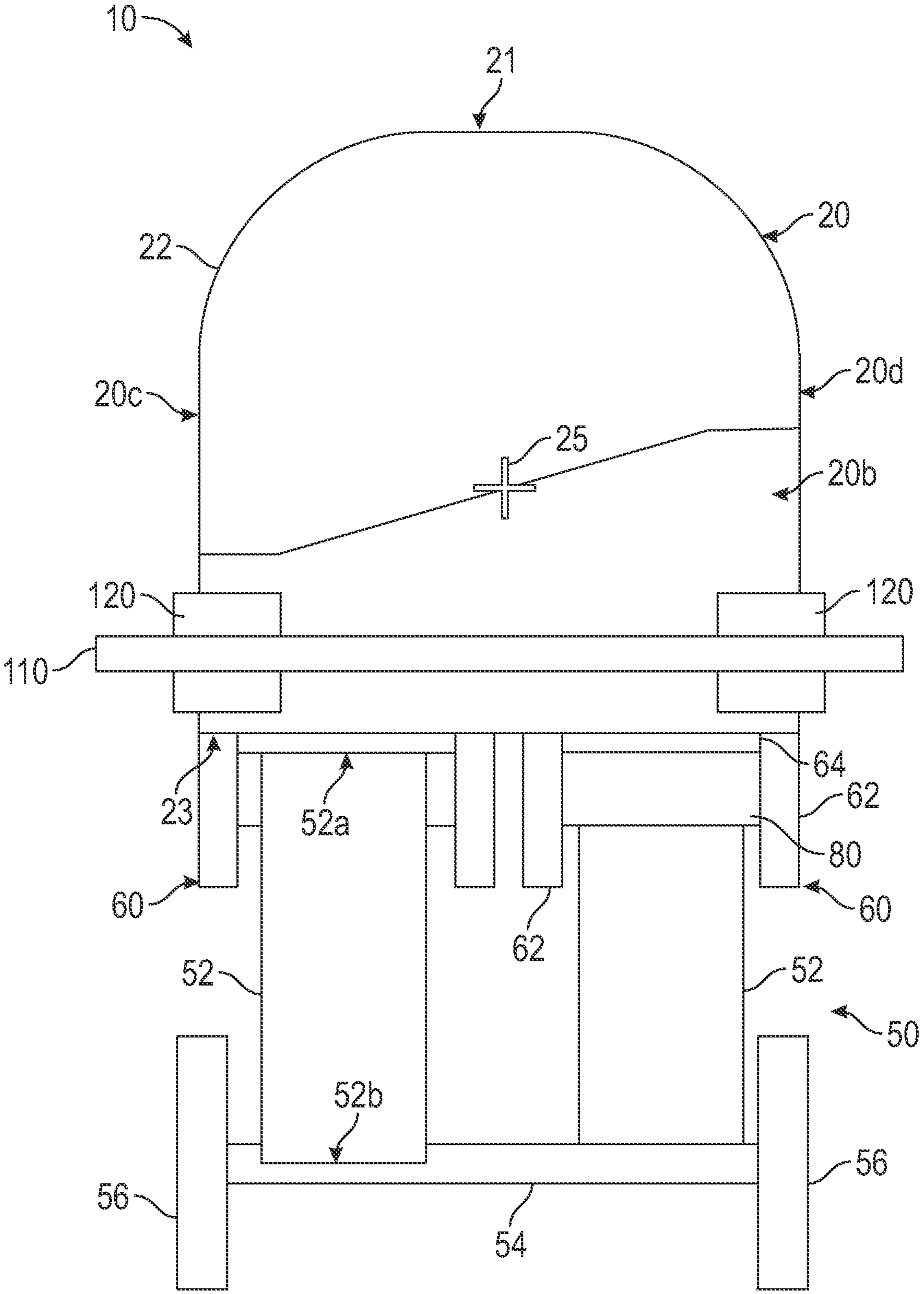
FIG. 4 is a side view of the cooking grill of FIG. 1 according to some embodiments.
Figure 5:
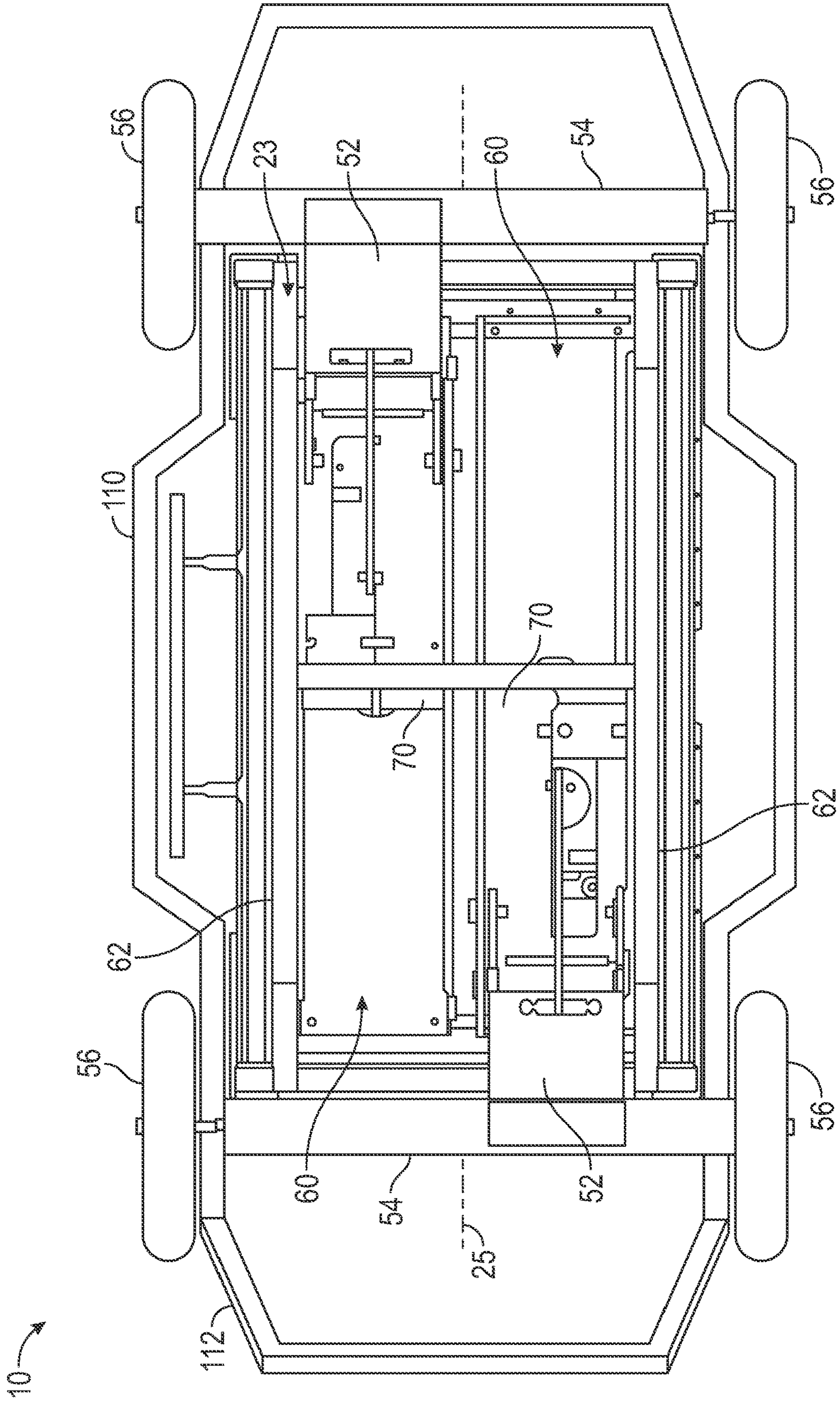
FIG. 5 is a bottom view of the cooking grill of FIG. 1 according to some embodiments.
Figure 6:
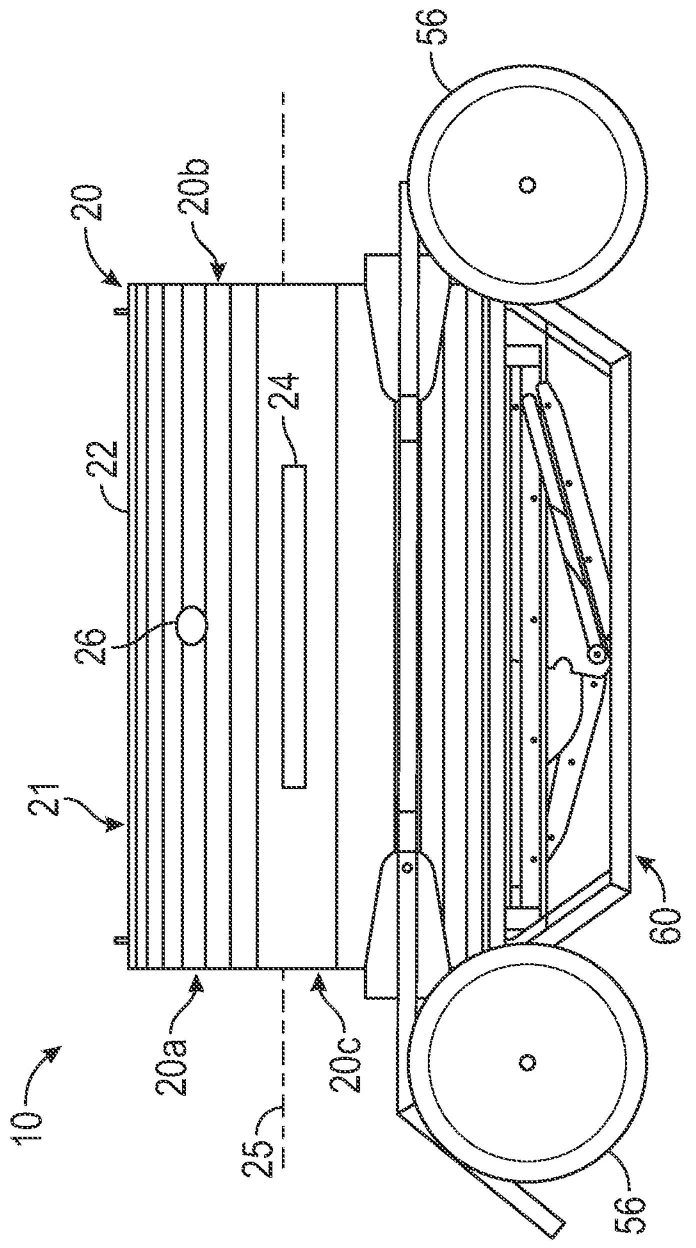
FIG. 6 is a front view of the cooking grill of FIG. 1, when the legs of the cooking grill in a collapsed position according to some embodiments.

Referring now to FIGS. 4-6, inner ends 52*a* of legs 52 may each be slidably received within and deployed from a pair of channels 60 positioned on bottom side 23 of cooking chamber 20. As best shown in FIG. 4, channels 60 may extend axially along bottom side 23 with respect to axis 25 such that channels 60 may be parallel to one another. During operations, the legs 52 may each be selectively transitioned to a deployed position shown in FIGS. 1-4 in which the outer ends 52*b* of legs 52 are extended outward from channels and bottom side 23 to engage with the ground (or other suitable support surface) such that cooking chamber 20 is elevated above the ground (or other support surface) for cooking operations. In addition, the legs 52 may each be selectively transitioned to a collapsed position shown in FIG. 6 in which the legs 52 are slidably received into the channels 60 so as to move the outer ends 52*b* and wheels 56 toward the bottom side 23 of cooking chamber 20. As described in more detail here, the collapsed position shown in FIG. 6 may facilitate storage of cooking grill 10 in a storage compartment of a vehicle. In addition, the collapsed position shown in FIG. 6 may facilitate storage of the cooking grill in other locations (e.g., other than a vehicle) such as, for instance, a garage, storage unit, closet, or other suitable location. Further details of the leg assembly 50 and the transitioning of the legs 52 between the deployed position (FIGS. 1-4) and collapsed position (FIG. 6) according to some embodiments are provided below.

Figure 7:
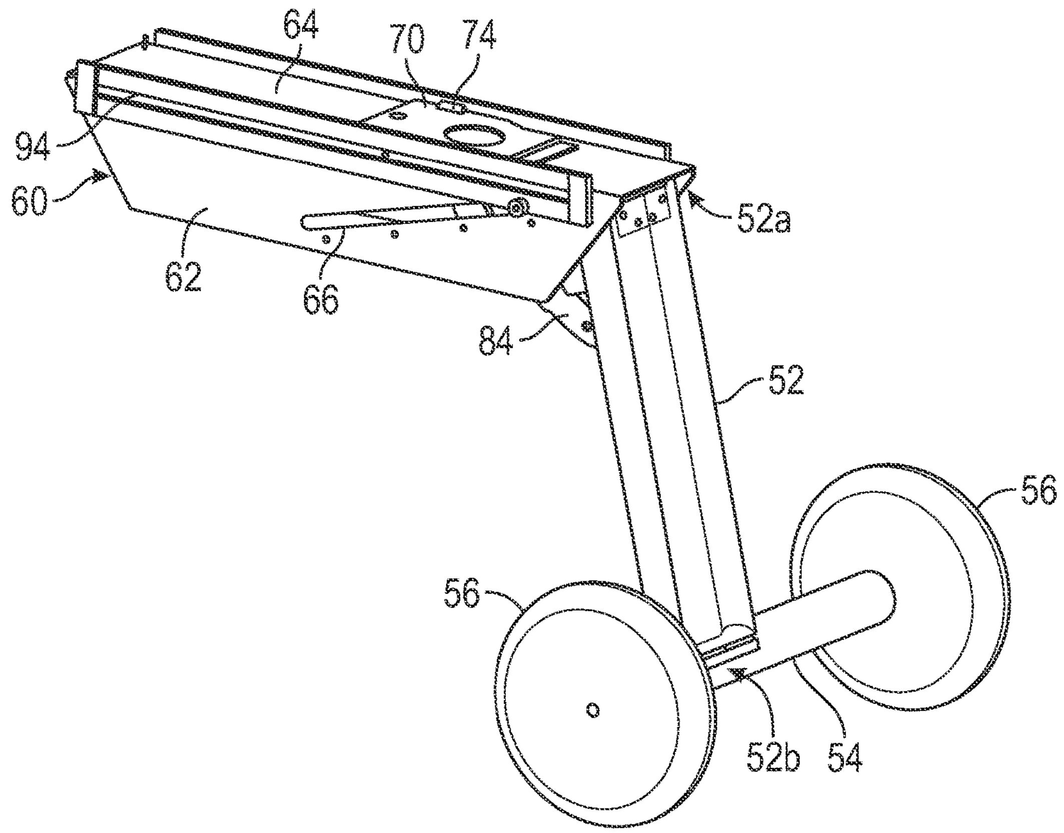
FIG. 7 is a perspective view of a channel and leg of the cooking grill of FIG. 1 in a deployed position according to some embodiments.
Figure 8:
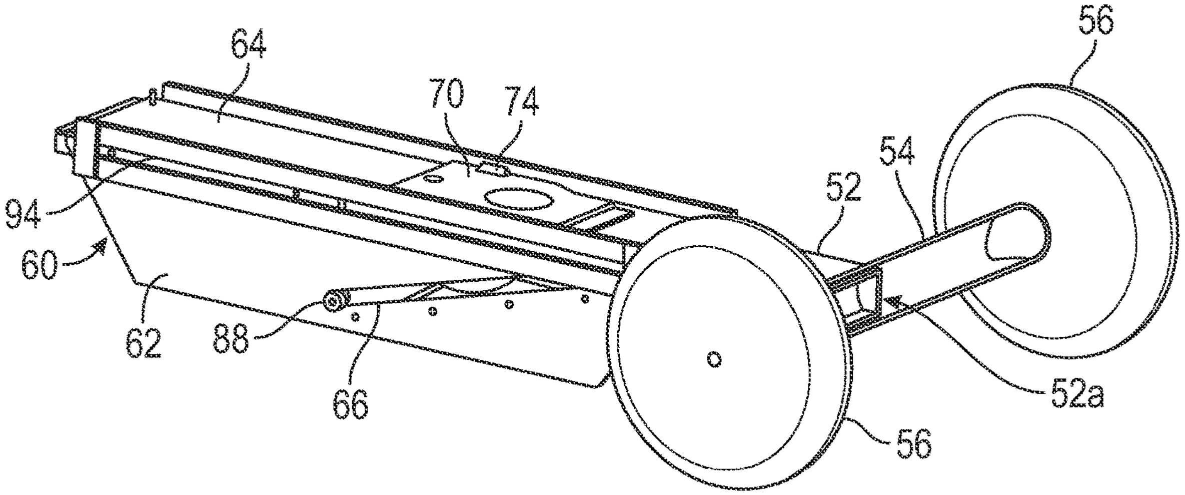
FIG. 8 is a perspective view of a channel and leg of FIG. 7 in a collapsed position according to some embodiments.
Figure 9:
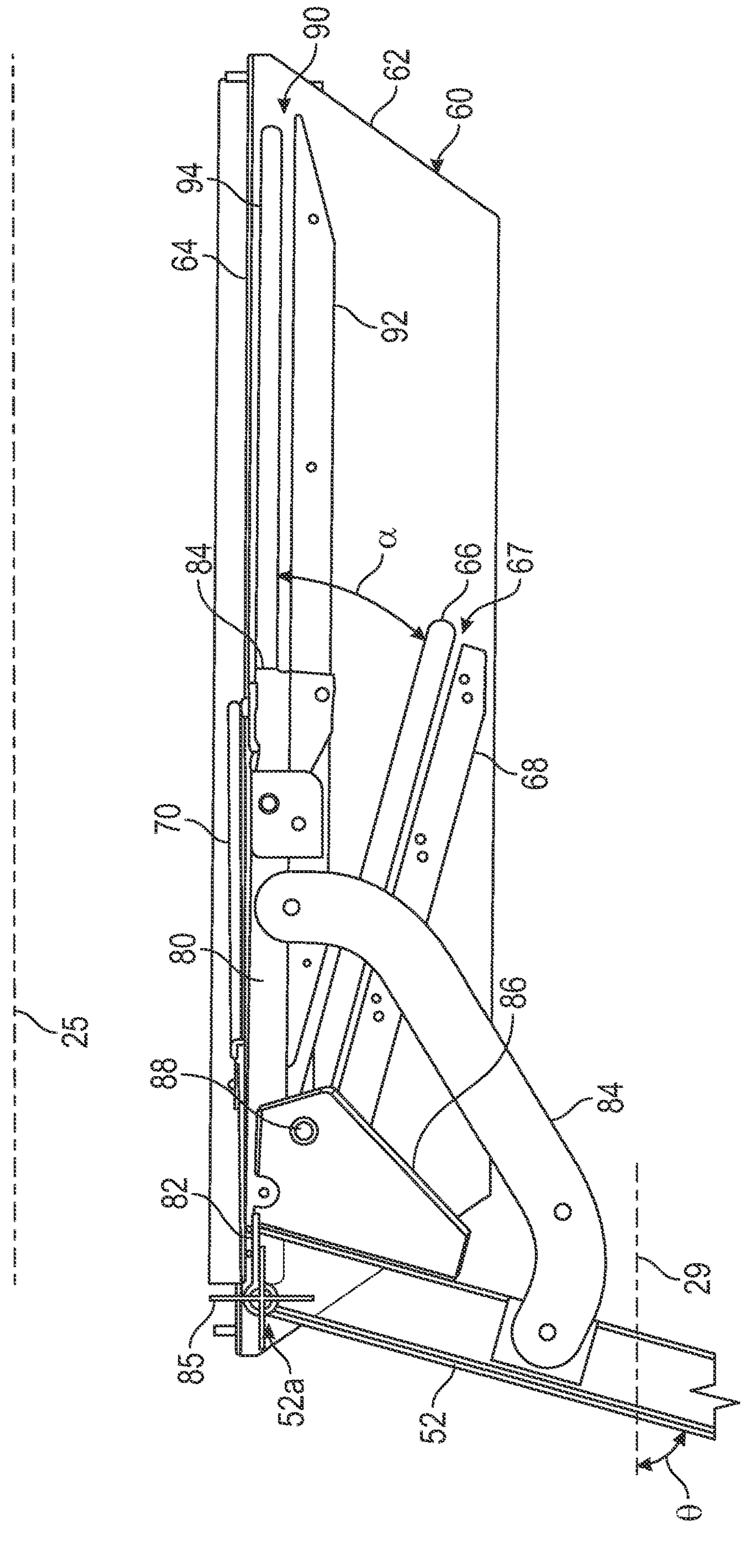
FIG. 9 is a side cross-sectional view of the channel and leg of FIG. 7 according to some embodiments.

Referring now to FIGS. 7-9, one of the legs 52 and the corresponding channel 60 of leg assembly 50 (FIGS. 1-6) is shown; however, the other portions of cooking grill 10 (FIGS. 1-6) are not shown so as to simplify the drawings. In particular, FIGS. 7 and 9 show the leg 52 and channel 60 with the leg 52 in the deployed position, and FIG. 8 shows the leg 52 and channel 60 with the leg 52 in the collapsed position. While one leg 52 and corresponding channel 60 are shown in FIGS. 7-9, it should be appreciated that the other leg 52 and channel 60 of cooking grill 10 are configured the same in at least some embodiments.

Each channel 60 includes a top plate 64 and a pair of side plates 62 coupled to and extending downward (for the orientation shown in FIGS. 7-9) from the top plate 64. Each of the plates 64, 62 are elongated in an axial direction with respect to longitudinal axis 25 of cooking chamber 20, when channel 60 is coupled to bottom side 23 as previously described (FIGS. 1-6). For convenience, longitudinal axis 25 is shown in FIG. 9 relative to channel 60 and leg 52.

Referring specifically now to FIG. 9, inner end 52*a* of leg 52 is pivotably coupled to a shuttle 80 that is slidably received within the channel 60 The shuttle 80 comprises a pair of rail engagement members 84 on opposing sides thereof that engage with a first pair of rail assemblies 90 extending along side plates 62 (note: only one of the rail engagement members 84 is visible in the cross-section of FIG. 9). In particular, each first rail assembly comprises a groove 94 and rail 92 formed in the corresponding side plate 62 (only one of the side plates 62 is visible in FIG. 9 as previously described). The grooves 94 and rails 92 may extend axially relative to longitudinal axis 25 of cooking chamber 20. The rail engagement members 84 may slide and/or roll along the grooves 94 and rails 92 of rail assemblies 90 during operations so as to move shuttle 80 axially within channel 60 (with respect to longitudinal axis 25) and thereby retract or extend leg 52 into or from, respectively, channel 60.

Upper end 52*a* is pivotably coupled to shuttle 80 via a hinge 82 having an axis of rotation 85 that extends in a direction that is perpendicular to a direction of longitudinal axis Thus, during operations, as shuttle 80 slides along grooves 94 and rails 92 via rail engagement members 84 to extend leg 52 out of channel 60, the leg 52 may pivot about axis of rotation 85 via hinge 82 (e.g., under the force of gravity) so as to increase an angle θ formed between leg 52

(particularly between a side of leg 52 facing outward or away from cooking grill 10) and longitudinal axis 25 (or a line 29 parallel thereto as shown in FIG. 9) and project leg 52 downward and away from channel 60 (and therefore bottom side 23 as shown in FIGS. 1-3). Conversely, as shuttle 80 slides along grooves 94 and rails 92 via rail engagement members 84 to retract leg 52 into channel 60, the leg 52 may pivot about axis of rotation 85 via hinge 82 so as to decrease the angle θ to (or toward) 0° such that leg 52 extends substantially parallel to longitudinal axis 25 as it is received within channel 60. In some embodiments, when the leg 52 is fully extended from the channel 60 (e.g., to the deployed position of FIGS. 1-4), the angle θ may range from greater than 0° to less than or equal to 90°.

Each of the side plates 62 may include a second rail assembly 67 that includes a groove 66 and rail 68 that extend at an angle α relative to the groove 94 and rail 92 of the corresponding first rail assembly 90 (thus, the groove 66 and rail 68 may also extend at the angle α relative to longitudinal axis 25). In some embodiments, the angle α may range from about 0° to about 60°. A rail follower 86 may be coupled to leg 52 at upper end 52*a* that includes a pin 88 that is to slide and/or roll within groove 66 of second rail assembly 67 during operations. Thus, as leg 52 is retracted into or extended out of channel 60, the pin 88 may traverse along groove 66 to guide the above-noted rotation of leg 52 about axis of rotation 85 via hinge 82. In addition, a cross-member 84 may be coupled to both shuttle at a first end and leg 52 at a second end. During operations, as shuttle 80 and leg 52 are traversed along channel 60, the cross-member 84 may transfer forces between leg 52 and shuttle 80 so as to further guide and facilitate the rotation of leg 52 about axis of rotation via hinge 82 as previously described.

In some embodiments, shuttle 80 may be replaced with any suitable mechanism that may facilitate the sliding of legs 52 into and out of the corresponding channels 60. For instance, in some embodiments upper ends 52*a* of legs 52 may be coupled to pin and slot mechanisms that are traversable within the channels 60 so as to guide legs 52 into and out of the channels 60 as previously described. In some embodiments, the upper ends 52*a* of legs 52 may be coupled to chain drives that may guide legs 52 into and out of the channels as previously described.

Referring still to FIG. 7-9, a locking member 70 may be positioned along top plate 64 of each channel 60 to maintain the deployed position of the legs 52 during operations. In some embodiments, locking member 70 may comprise plate that forms a flat spring (e.g., leaf spring) that is biased downward toward top plate 64. In some embodiments, other biasing members (e.g., torsional springs, flat springs, coiled spring) may be utilized to bias locking member 70 toward top plate 64.

Figure 10:
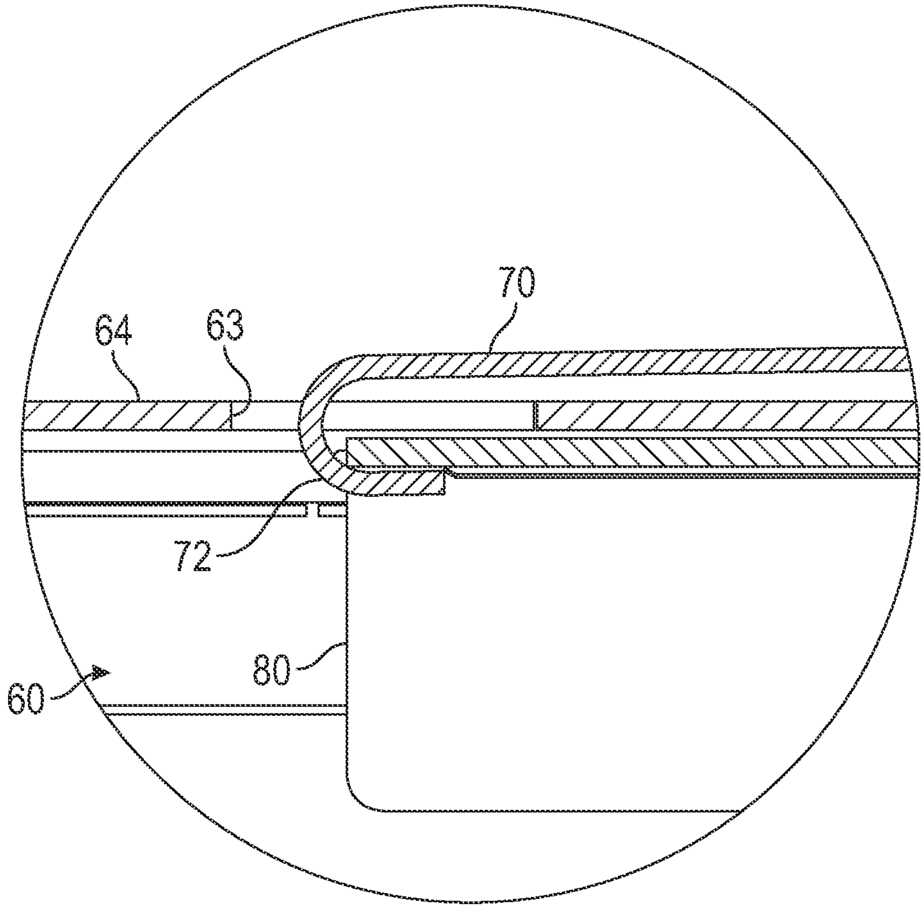
FIG. 10 is an enlarged cross-sectional view of a locking member and shuttle of the channel and leg of FIG. 7 according to some embodiments.

Referring now to FIG. 10, locking member 70 may comprise a hook 72 that is biased (e.g., by locking member 70) through an aperture 63 in top plate 64 into channel 60. During operations, when leg 52 is extended from channel 60 to the deployed position (FIGS. 1-4), the shuttle 80 may advance past aperture 63 within channel 60 so that hook 72 of locking member 70 advances through aperture 63 to engage with shuttle 80. As a result of this engagement of hook 72 and shuttle 80, the shuttle 80 (and thus leg 52) is prevented from advancing into channel 60 toward the collapsed position (FIG. 6), such as under the weight of the cooking chamber 20 (FIGS. 1-3).

Figure 12:
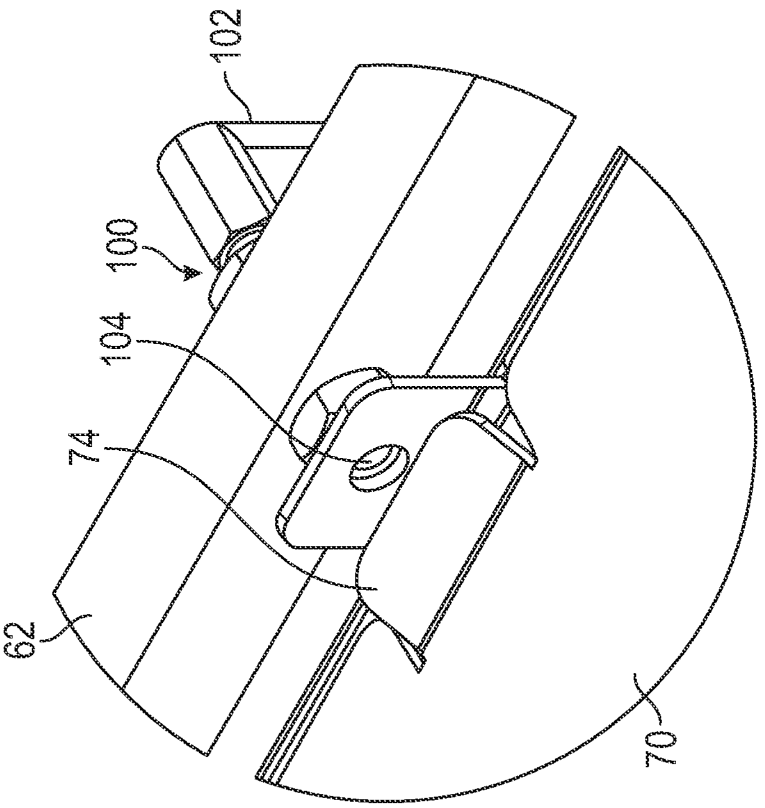
FIGS. 11 and 12 are cross-sectional views of a latch assembly coupled to the channel of FIG. 7 engaging and disengaging, respectively, with the locking member according to some embodiments.
Figure 11:
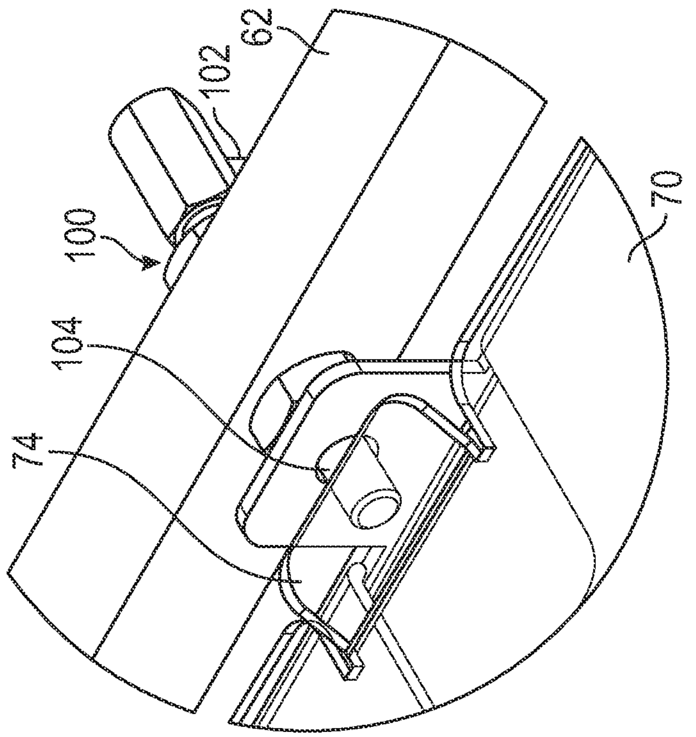

Referring now to FIGS. 11 and 12, a latch assembly 100 is coupled to channel 60. For instance, in some embodiments, latch assembly 100 is coupled to one of the side plates 62. In some embodiments, latch assembly 100 may include a pin 104 that is aligned with an angled lift plate 74 coupled to (or defined on) the locking member 70. During operation, the pin 104 may be biased (e.g., via a spring mechanism—not shown) away from the lift plate 74 such that locking member 70 is free to extend downward toward top plate 64 to engage with shuttle 80 as shown in FIG. 10 and described above. In addition, latch assembly 100 includes an engagement handle 102 that is coupled to (or integrated with) the pin 104. Referring now to FIGS. 10-12, during operations, a user may push the engagement handle 102 inward to latch assembly 100 so that pin 104 is extended to engage with the angled lift plate 74 and lift locking member 70 away from top plate 64. The lifting of the locking member 70 may withdraw hook 72 into (or through) aperture 63 so that shuttle 80 may once again freely traverse into the channel 60 (so as to retract leg 52 into channel 60 as previously described).

While a particular example of latch assembly 100 is shown in FIGS. 11 and 12 according to some embodiments, it should be appreciated that latch assembly 100 may be different in various embodiments. Generally speaking, latch assembly 100 may comprise any suitable mechanism or system that is configured to selectively disengage hook 72 of locking member 70 from shuttle 80 such that shuttle 80 may freely traverse into or out of channel 60 during operations.

Referring now to FIGS. 1-3 and 13, cooking grill 10 may comprise a lift bar 110 coupled to cooking chamber 20 that may be grasped and manipulated by a user to maneuver cooking grill 10 during operations. In some embodiments, lift bar 110 surrounds a periphery of cooking chamber 20 and includes a first end 110*a* and a second end 110*b* opposite first end 110*a*. First end 110*a* may be aligned with first end 20*a* of cooking chamber 20, and second side 110*b* may be aligned with second end 20*b* of cooking chamber 20. Second end 110*b* includes an angled engagement member 112 that is angled downward relative to the other portions of lift bar 110. More particularly, the angled engagement member 112 may lie within a second plane 113, while the remaining portions of the lift bar 110 may lie within a first plane 115. The second plane 113 may extend at a non-zero angle β relative to the first plane 115. In some embodiments, the angle β may range from about 90° to about 180°. For instance, in some embodiments, the angle β may equal about 130°.

Figure 13:
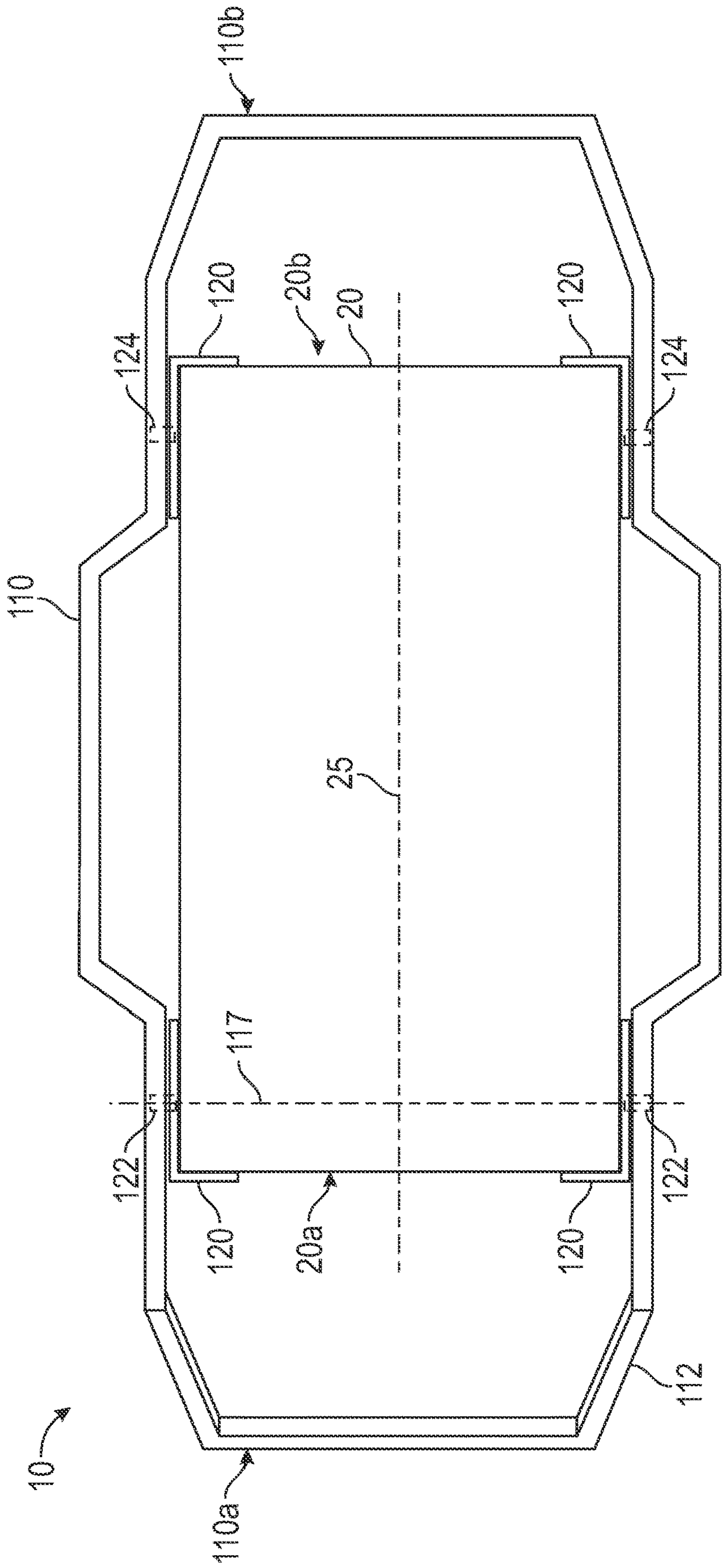
FIG. 13 is a top view of the cooking grill of FIG. 1 according to some embodiments.

Referring specifically now to FIG. 13, lift bar 110 may be coupled to cooking chamber 20 via a plurality of connections. For instance, lift bar 110 may be coupled to mounting brackets 120 coupled to or integrated with cooking chamber 20. Mounting brackets 120 may be positioned at each corner of cooking chamber 20 so that two of the mounting brackets 120 are positioned at (or proximate to) first end 20*a* and another two of the mounting brackets 120 are positioned at (or proximate to) second end 20*b*.

A pair of first connections 122 couple lift bar 110 to the mounting brackets 120 at (or proximate to) first end 20*a*, and a pair of second connections 124 coupled lift bar 110 to the mounting brackets 120 at (or proximate to) second end 20*b*. Thus, the first connections 122 are more proximate the first end 20*a* than the second end 20*b*, and the second connections 124 are more proximate the second end 20*b* than the first end 20*a*. The connections 122, 124 may comprise any suitable connection member or assembly, such as, for instance, a pinned connection, welded connection, bolts, rivets, etc. In some embodiments, the pair of second connections 124 may be selectively releasable by a user so that lift bar 110 may freely pivot about an axis 117 extending in a direction that is perpendicular to the longitudinal axis 25 relative to cooking chamber 20 via the first connections 122.

Figure 14:
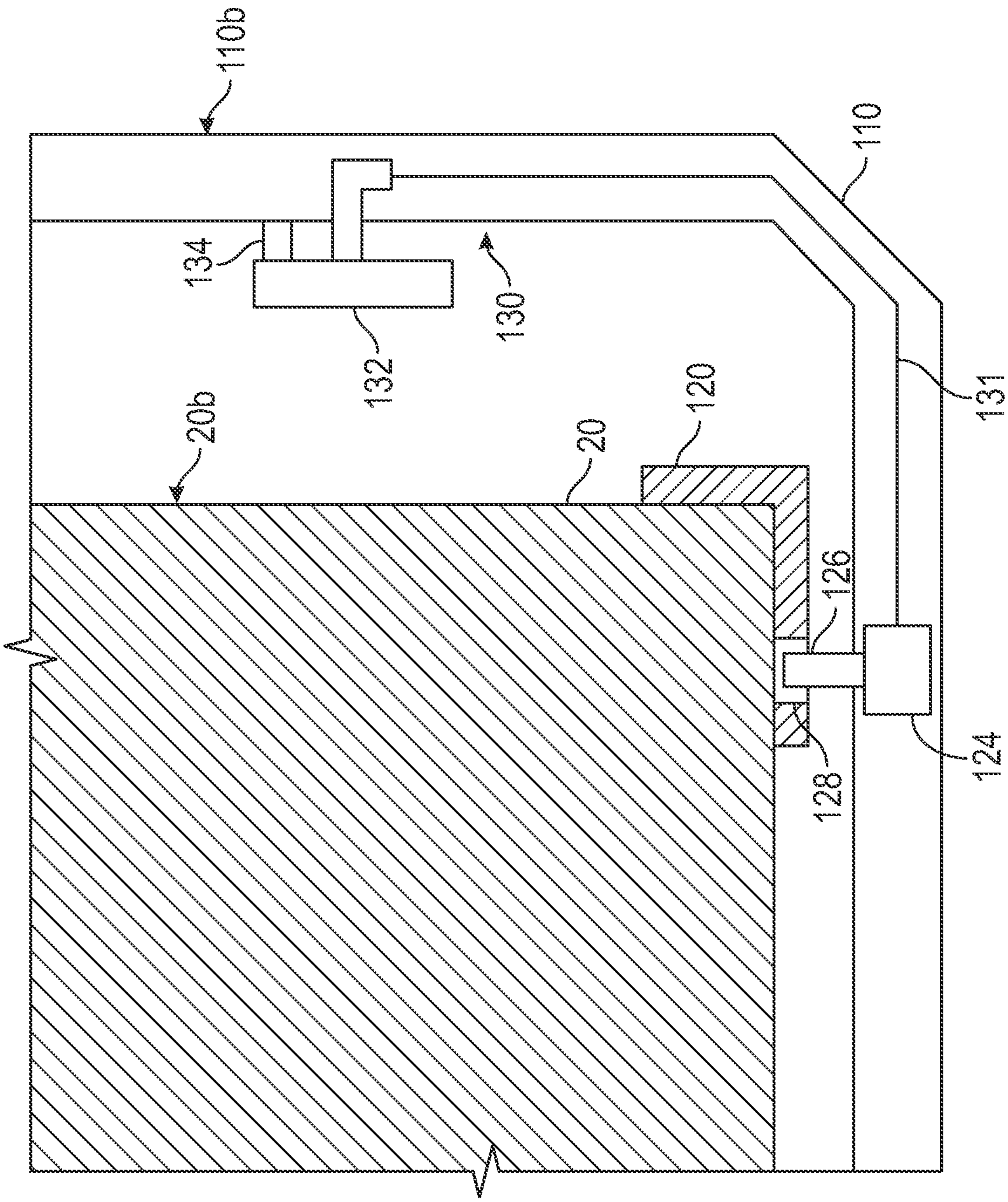
FIG. 14 is an enlarged schematic cross-sectional view of a portion of a lift bar of the cooking grill of FIG. 1 according to some embodiments.

Referring now to FIG. 14, one of the second connections 124 is shown in more detail according to some embodiments. It should be appreciated that, in some embodiments, both of the second connections 124 may be as shown in FIG. 14. In particular, in some embodiments, second connection 124 may comprise a biased pin 126 that extends into an aperture 128 formed on the corresponding mounting bracket 120. The pin 126 may be biased (e.g., via a spring or other suitable biasing member) to be withdrawn from aperture 128. A release mechanism 130 may be coupled to second connection 124 that is configured to selectively release the second connection 124 during operations. Release mechanism 130 may comprise a wire 131 extending from second connection 124, through lift bar 110 to a handle 132 positioned at second end 110*b*. The handle 132 may be biased outward from lift bar 110 via a biasing member 134 (e.g., a coiled spring, charged cylinder) such that tension is exerted on the wire 131. The tension in wire 131 may be transferred to pin 126 such that the bias exerted on pin 126 is overcome and the pin 126 is extended into aperture 128.

During operations, when a user desires to disconnect the second connections 124 from cooking chamber 20, the user may depress or squeeze the handle 132 against the bias provided by biasing member 134 so that the tension in the wire 131 is reduced and the pin 126 is withdrawn from aperture 128. Releasing of the handle 132 may once again increase the tension in wire 131 so that pin 126 is extended into aperture 128. Thus, during operations, a user may selectively disconnect the second connections 124 by depressing or squeezing the handle(s) 132 on second end 110*b* of lift bar 110. In some embodiments, the when handle(s) 132 are released (or not depressed) by the user, the pins 126 on second connections 124 may automatically extend (e.g., pop) into apertures 128 when lift bar 110 is rotated to align the pins 126 with apertures 128 during operations. In some embodiments, the pins 126 may be replaced with cams that are rotated out of engagement with aperture 128 (or another suitable depression, notch, etc.) to selectively disconnect the second connection 124.

Referring now to FIGS. 15A-15F, a sequence for loading the cooking grill 10 into a storage compartment 152 of a vehicle 150 is shown. In some embodiments, the vehicle 150 may comprise a pickup truck, and the storage compartment 152 may comprise the bed of the pickup truck (thus, in describing the sequence of FIGS. 15A-15F, the storage compartment 152 may be referred to as a "truck bed 152"); however, it should be appreciated that vehicle 150 may comprise other types of vehicles in other embodiments (e.g., sedan, box truck, SUV, van, etc.). In some embodiments, the sequence described below (and shown in FIGS. 15A-15F may be performed to load the cooking grill 20 onto a raised platform or surface that is not part of a vehicle (e.g., a shelf, table, etc.). Generally speaking, the cooking grill 10 may be loaded onto the raised storage compartment 152 via a leverage provided by the lifting bar 110. Further details of the loading sequence of FIGS. are now provided below.

Figure 15A:
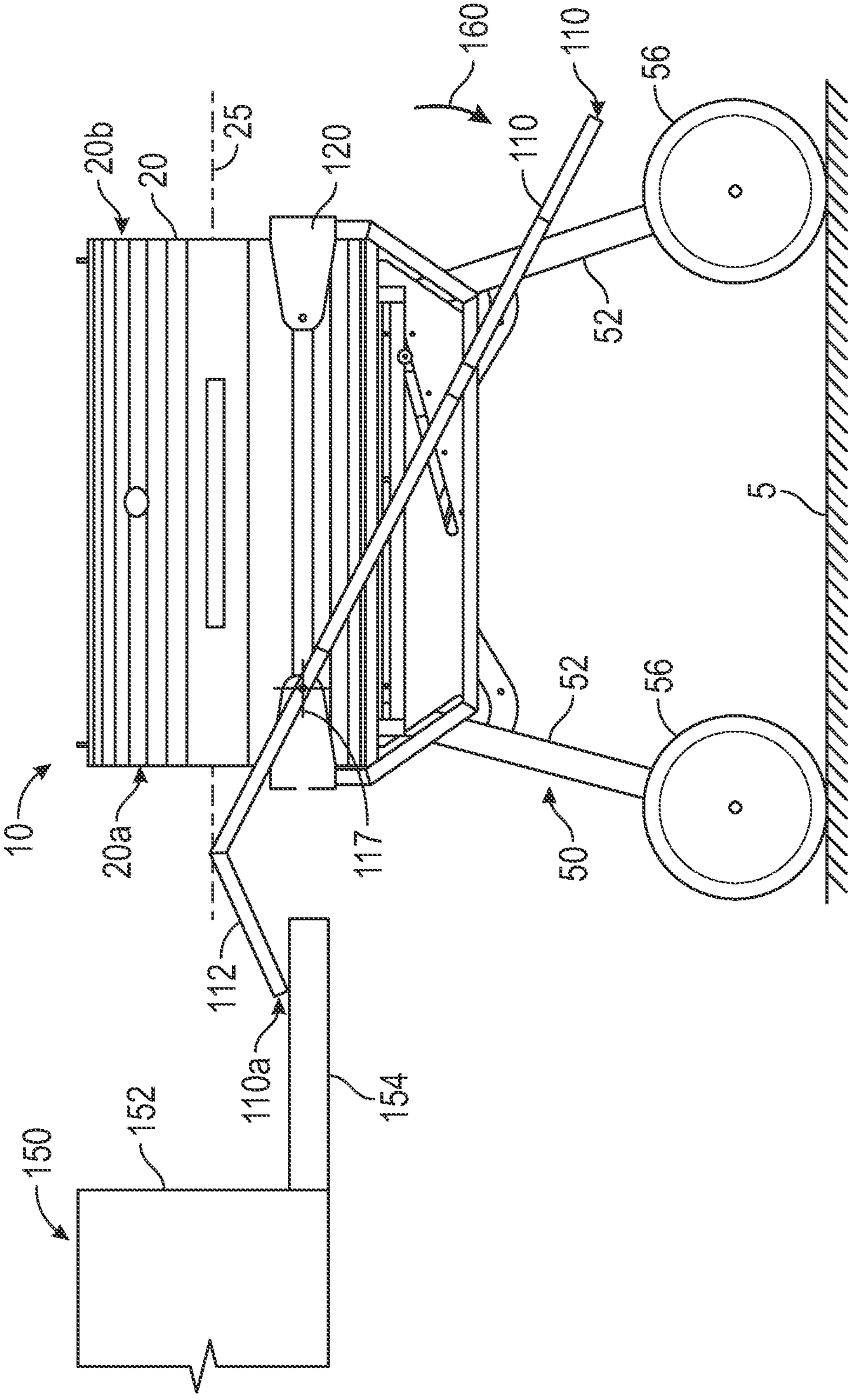
FIGS. 15A-15F are sequential side views of a process for loading the cooking grill of FIG. 1 into a storage compartment of a vehicle according to some embodiments.

Referring first to FIG. 15A, initially, the cooking grill 10 may be positioned adjacent to the storage compartment 152 with legs 52 of leg assembly 50 both extended to the deployed position of FIGS. 1-4 as previously described. Initially, the user may disconnect the pair of second connections 124 (e.g., via the release mechanism 130 shown in FIG. 14) from the corresponding mounting brackets 120 on cooking chamber 20 as previously described and shown in FIGS. 13 and 14.

As shown in FIG. 15A, once the second connections 124 are released, the lift bar 110 is pivoted about the axis 117 to place the angled lifting member 112 on the tailgate 154 of the truck bed 152. In particular, the second end 110*b* of lift bar 110 is pivoted downward about axis 117 along the arrow 160 such that the angled lifting member 112 is raised above the height of tailgate 154. The cooking grill 10 may then be moved by user, via wheels 56, so as to place the raised angled lifting member above tailgate 154. Thereafter, the user may rotate the second end 110*b* of lift bar 110 upward, opposite arrow 160, to engage the angled lifting member 112 with tailgate 154 as shown in FIG. 15A.

Figure 15B:
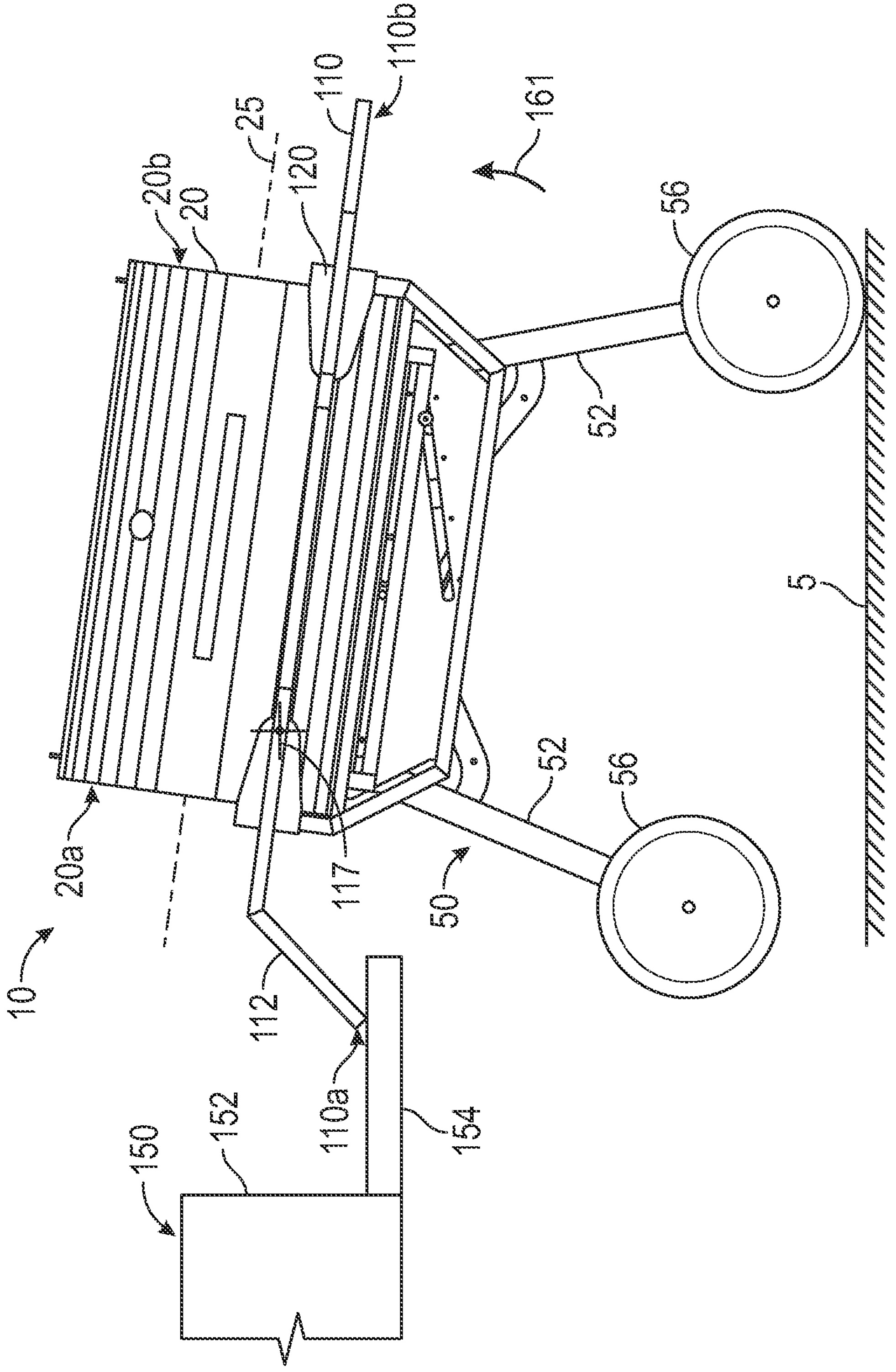

Referring now to FIG. 15B, after placing the angled lifting member 112 of lifting bar 110 on tailgate 154, the user may continue to rotate second end 110*b* of lift bar 110 upward, along arrow 161, so as to rotate lift bar 110 in a counter clockwise direction about axis 117 according to the viewing direction of FIG. 15B. Due to the angle of angled lifting member 112 compared to the other portions of lifting bar 110 (e.g., the angle β previously described and shown in FIGS. 2 and 3), and the engagement of angled lifting member 112 and tailgate 154, the upward rotation of lifting bar 110, along arrow 161, lifts the first end 20*a* of cooking chamber 20 upward. Without being limited to this or any other theory, the moment arm provided by lifting bar 110 (e.g., extending from the first connections 122 to the second end 110*b* of lifting bar 110 along the plane 115 shown in FIGS. 2 and 3) may provide a mechanical advantage to the user such that the user may lift the first end 20*a* of cooking chamber 20 toward tailgate 154 and truck bed 152 with relative ease.

Figure 15C:
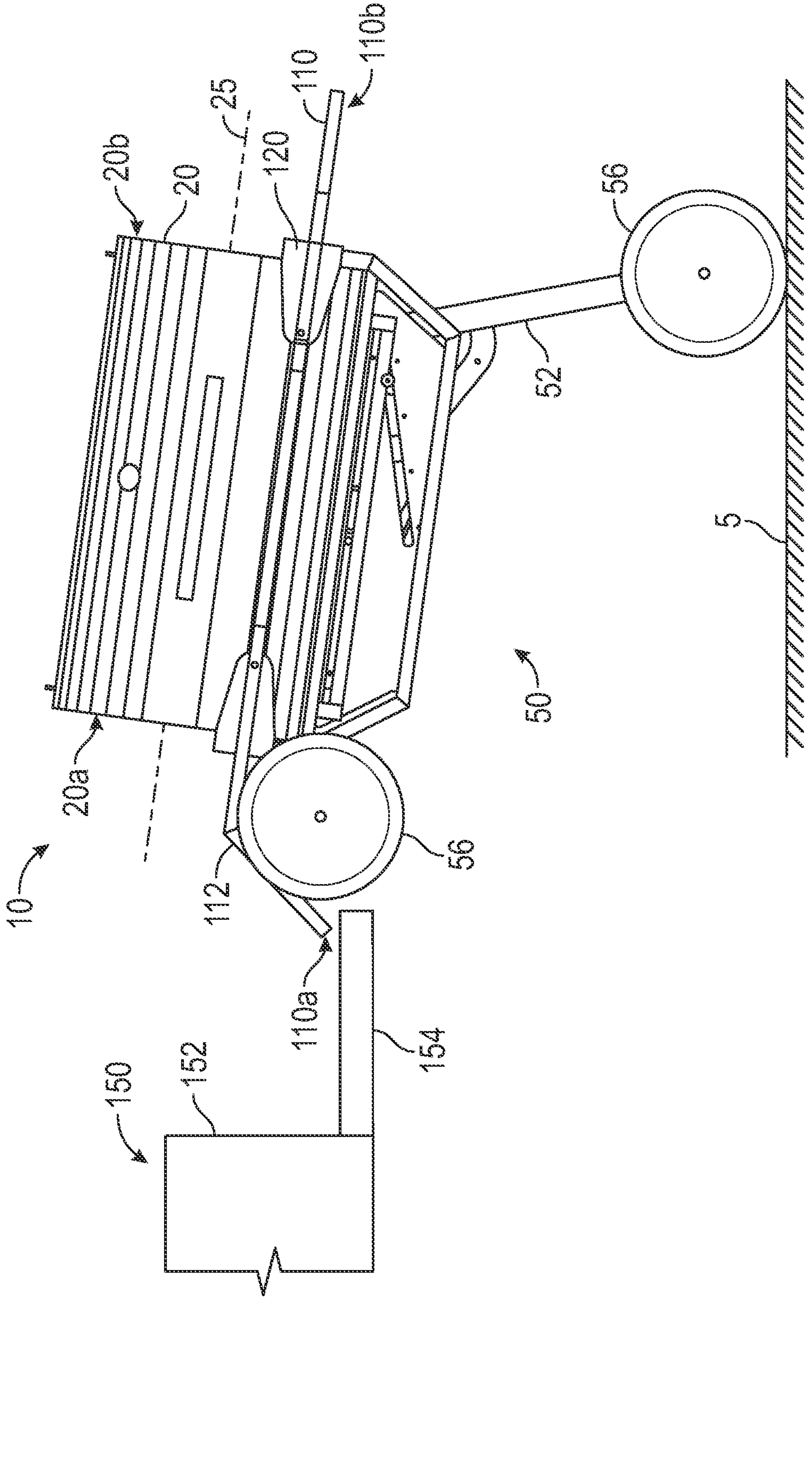

Referring now to FIGS. 15B and 15C, the upward rotation of lift bar 110, along arrow 161, may continue until second connections 124 (e.g., via release mechanism 130 shown in FIG. 14) are once again aligned with the corresponding mounting brackets 120 on (or proximate to) second end 20*b* of cooking chamber 20 (and plane 115 of lift bar 110 is again parallel, or substantially parallel, with longitudinal axis 25 of cooking chamber 20). The user may then reconnect the second connections 124 (FIGS. 13 and 14) with the cooking chamber 20 as previously described to maintain the position of cooking grill 10 relative to truck bed 152 as shown in FIG. 15B. Thereafter, as shown in FIG. 15C, the user may transition the leg 52 proximate first end 20*a* of cooking chamber 20 to the collapsed position in the manner previously described above such that the wheels 56 coupled to the end of these legs 52 are brought upward toward tailgate 154.

Figure 15D:
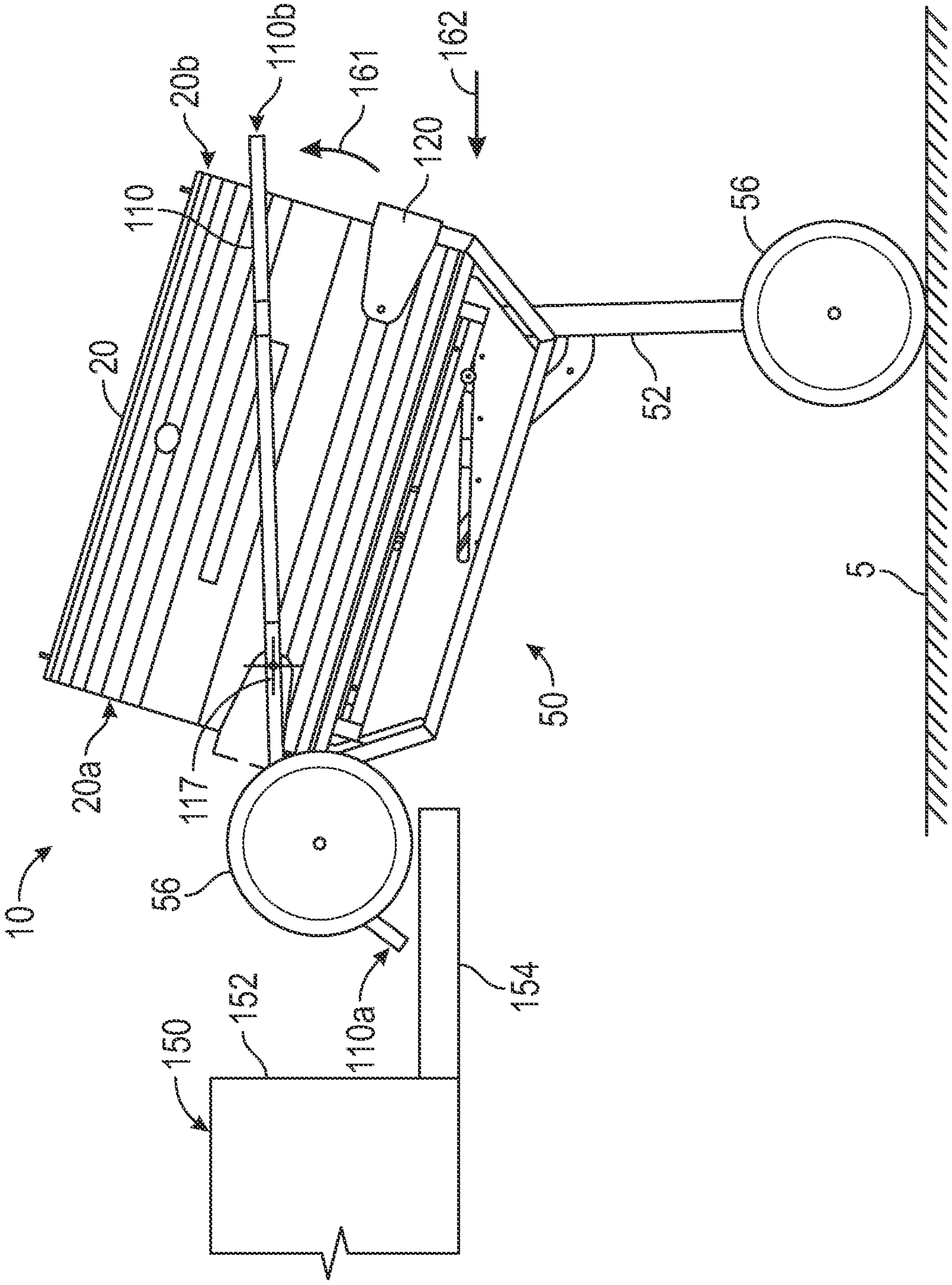

Referring now to FIG. 15D, once the leg 52 proximate first end 20*a* of cooking chamber 20 are placed in the collapsed position, the user may once again disconnect the second connections 124 (FIGS. 13 and 14) and rotate the second end 110*b* of lift bar 110 upward along the arrow 161 to further raise first end 20*a* relative to tailgate 154. In addition, the user may move (e.g., push) the cooking grill 10 forward, along arrow 162, to cause wheels 56 proximate first end 20*a* to rotate onto tailgate 154 as shown in FIG. 15D.

Figure 15E:
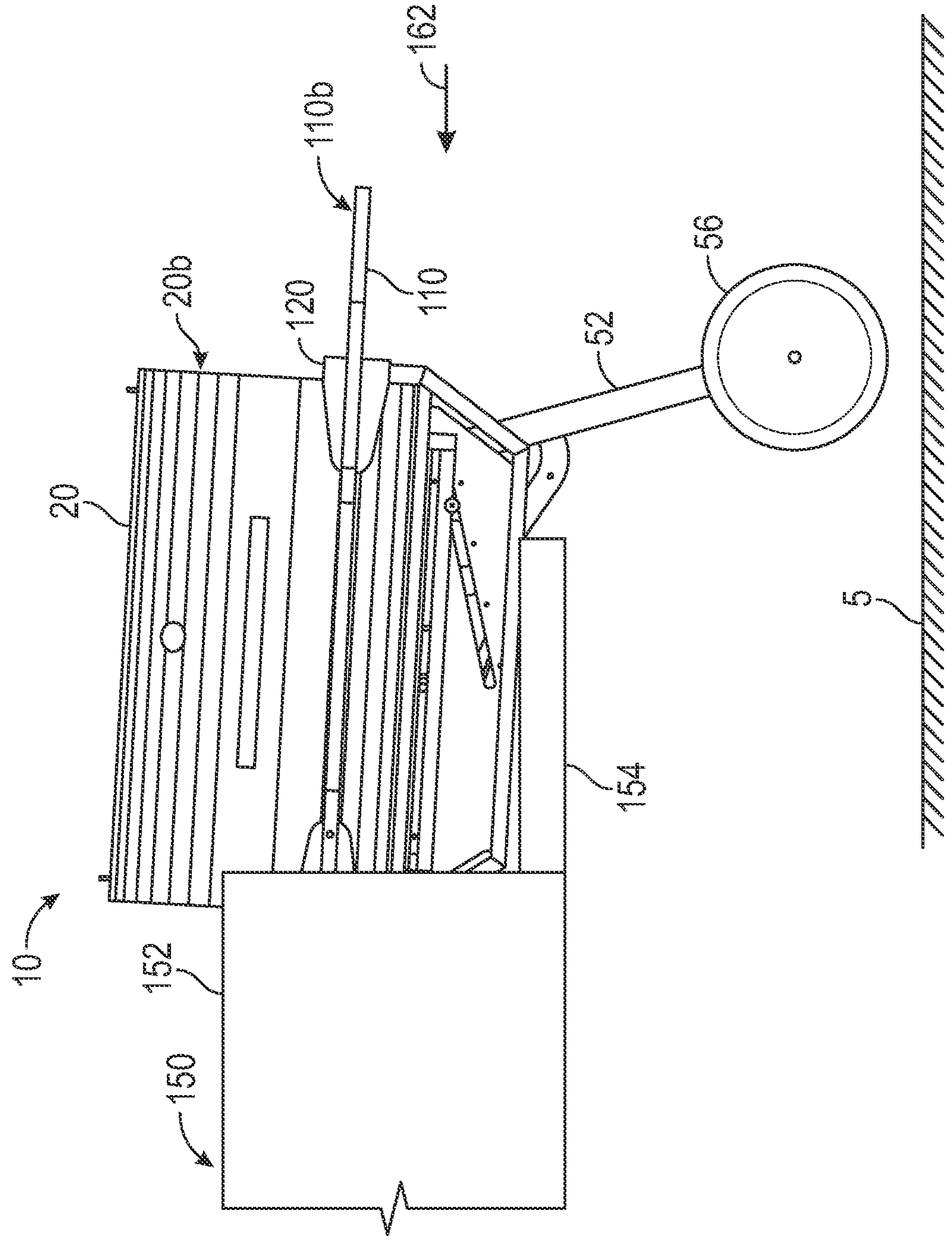
Figure 15F:
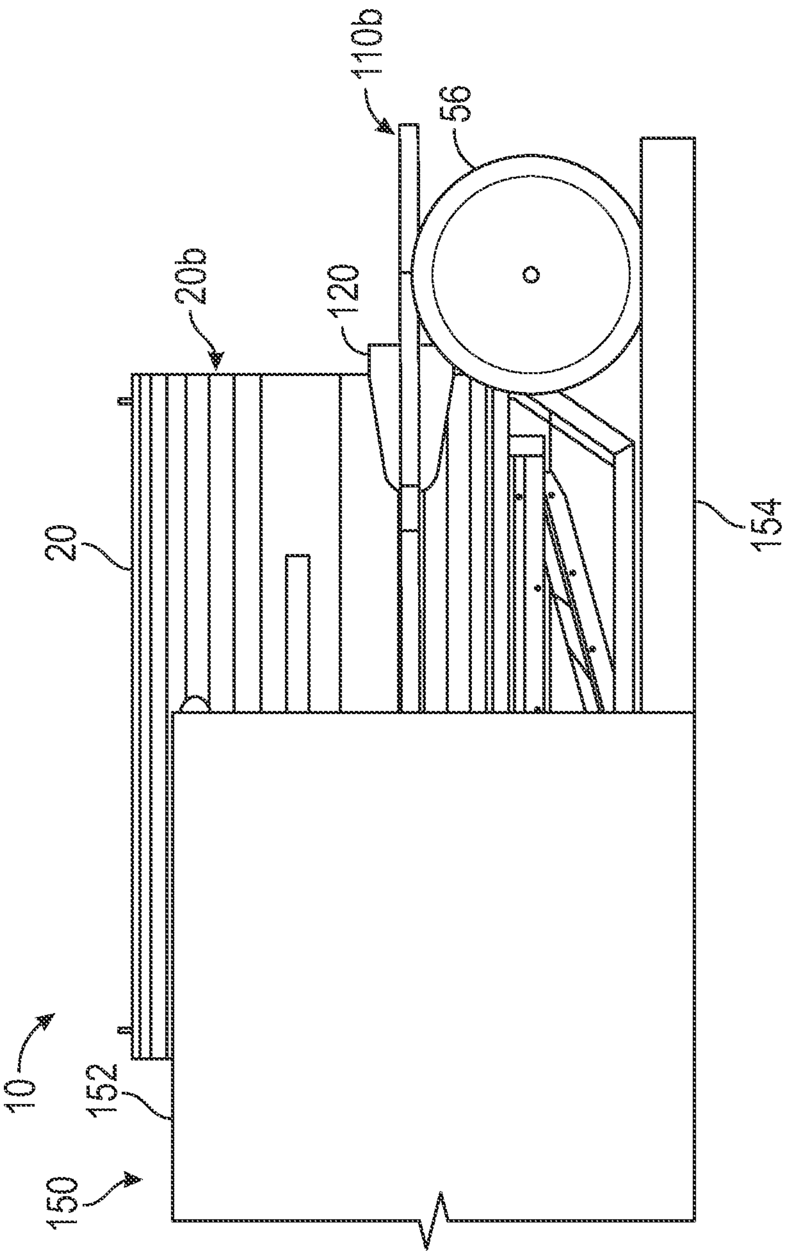

Referring now to FIGS. 15E and 15F, once wheel 56 is fully seated on tailgate 154, the user may continue to move (e.g., push) the cooking grill 10 along arrow 162 into truck bed 152 until the wheels 56 coupled to the leg 52 proximate second end 20*b* of cooking chamber 20 are lifted off of the ground (FIG. 15E). At this point, all (or substantially all) of the weight of cooking grill 10 is being borne by the truck bed 152 (e.g., including tailgate 154), so that the user may transition the leg 52 proximate second end 20*b* of cooking chamber 20 to the collapsed position as previously described. In addition, in some embodiments, once the full weight of the cooking grill 10 is being borne by truck bed 152, the user may once again reconnect the second connections 124 to the mounting brackets 120 at (or proximate to) second end 20*b* of cooking chamber 20. Thereafter, the cooking grill 10 may be fully slid up onto tailgate 154 and into truck bed 152 as shown in FIG. 15F.

The sequence for unloading the cooking grill 10 may comprise a reverse of the sequence described above for FIGS. 15A-15F. Thus, generally speaking, the user may slide (e.g., pull) the cooking grill 10 toward the edge of the tailgate 154 until the wheels 56 coupled to the leg 52 proximate second side 20*b* of cooking chamber 20 extend past the edge of the tailgate 154. Thereafter, the user may transition the leg proximate second end 20*b* of cooking chamber 20 to the deployed position and then continue to pull the cooking grill 10 until these wheels 56 engage with the ground 5. Then the user may perform the reverse of the sequence steps described above for FIGS. 15A-15D to unload the cooking grill 10 from the truck bed 152 and transition the leg 52 proximate first end 20*a* of cooking chamber 20 to the deployed position and place the wheels 56 coupled thereto on the ground 5. During this unloading sequence, the user may rotate the lift bar 110 about the axis 117 to gain mechanical advantage in generally the same manner described above for loading the cooking grill 10 (except for unloading as previously described).

Without being limited to this or any other theory, the mechanical advantage provided by the lift bar 110 as well as the independent collapsibility of the legs 52 allows a user to more easily load and unload the cooking grill 10 from a raised platform. Thus, the cooking chamber 20 may be of relatively large size so as to provide enhanced cooking capacity and performance without sacrificing the mobility of the cooking grill 10.

As described herein, the embodiments disclosed herein include cooking grills that may be more easily loaded and unloaded from a raised platform, such as, for instance from a vehicle storage compartment (e.g., a bed of a pickup truck). Thus, through use of the embodiments disclosed herein, a user may more easily and safely transport and maneuver a relatively large cooking grill.

The above-discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In discussion herein and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A cooking grill comprising:

a cooking chamber comprising a longitudinal axis, a first end, and a second end opposite the first end;

a plurality of legs pivotably coupled to the cooking chamber; and a lift bar coupled to the cooking chamber at a first connection and a second connection, wherein the first connection is more proximate the first end than the second end and the second connection is more proximate the second end than the first end, and wherein the lift bar is configured to pivot relative to the cooking chamber about the first connection; and a release mechanism coupled to the second connection that is configured to disconnect the second connection.

2. The cooking grill of claim 1, wherein the lift bar comprises:

a first portion extending along a first plane; and a second portion extending along a second plane, wherein the second plane extends at a non-zero angle to the first plane.

3. The cooking grill of claim 1, wherein the lift bar is configured to pivot about an axis of rotation extending in a direction that is perpendicular to a direction of the longitudinal axis, via the first connection when the second connection is disconnected.

4. The cooking grill of claim 1, wherein the plurality of legs are configured to slide into a plurality of channels coupled to a bottom side of the cooking chamber.

5. The cooking grill of claim 4, comprising a plurality of locking members positioned within the plurality of channels, wherein each of the plurality of legs is coupled to a shuttle that is configured to slide within a corresponding one of the plurality of channels and is configured to engage with a corresponding one of the locking members to maintain a position of the leg.

6. The cooking grill of claim 5, wherein each channel of the plurality of channels comprises:

a top plate; and a pair of side plates coupled to the top plate, wherein each locking member of the plurality of locking members comprises a hook that is biased into an aperture in the top plate of a corresponding one of the plurality of channels.

7. The cooking grill of claim 6, comprising a plurality of latch assemblies, wherein each latch assembly is configured to engage with a corresponding one of the plurality of locking members to lifting the corresponding one of the plurality of locking members away from the top plate of a corresponding one of the plurality of channels.

8. A cooking grill, comprising:
a cooking chamber; and
a leg coupled to the cooking chamber,
wherein the leg is to transition between:
a deployed position in which the leg extends outward from the cooking chamber; and
a collapsed position in which the leg is received within a channel on a bottom side of the cooking chamber,
wherein the cooking chamber comprises a longitudinal axis, a first end, and a second end spaced from the first end along the longitudinal axis, and
wherein the cooking grill comprises:
a lift bar coupled to the cooking chamber at a first connection and a second connection, wherein the first connection is more proximate the first end than the second end and the second connection is more proximate the second end than the first end, and wherein the lift bar is configured to pivot relative to the cooking chamber about the first connection; and
a release mechanism coupled to the second connection that is configured to disconnect the second connection.

9. The cooking grill of claim 8, wherein the lift bar comprises:
a first portion extending along a first plane; and
a second portion extending along a second plane, wherein the second plane extends at a non-zero angle to the first plane.

10. The cooking grill of claim 9, wherein the lift bar is configured to pivot about an axis of rotation extending in a direction that is perpendicular to a direction of the longitudinal axis, via the first connection when the second connection is disconnected.

11. A method of loading a cooking grill onto a storage surface, the method comprising:
(a) positioning the cooking grill proximate the storage surface, wherein the cooking grill comprises:
a cooking chamber having a first end and a second end opposite the first end;
one or more legs coupled to the cooking chamber; and
a lift bar coupled to the cooking chamber at a first connection and a second connection, wherein the first connection is more proximate the first end and the second end and the second connection is more proximate the second end than the first end;
(b) disconnecting the lift bar from the cooking chamber at the second connection;
(c) engaging the lift bar with the storage surface;
(d) pivoting the lift bar about the first connection after (c);
(e) lifting the cooking chamber upward during (d); and
(f) moving the cooking grill onto the storage surface after (e).

12. The method of claim 11, wherein the one or more legs of the cooking grill comprises a first leg and a second leg, wherein the method comprises:
(g) collapsing the first leg toward the cooking chamber after (e) and before (f); and
(h) collapsing the second leg into the cooking chamber after (e) and (g).

13. The method of claim 12, wherein (g) comprises sliding the first leg into a first channel on a bottom side of the cooking chamber.

14. The method of claim 13, wherein (h) comprises sliding the second leg into a second channel on the bottom side of the cooking chamber.

15. The method of claim 13, comprising maintaining the first leg in the first channel by engaging a hook of a locking member with a shuttle coupled to the first leg.

* * * * *